(12) United States Patent
Sahin et al.

(10) Patent No.: US 8,428,519 B2
(45) Date of Patent: Apr. 23, 2013

(54) INTER-CARRIER INTERFERENCE MANAGEMENT IN DEDICATED CHANNEL FEMTOCELL NETWORKS

(75) Inventors: Alphan Sahin, Tampa, FL (US); Ismail Guvenc, Santa Clara, CA (US); Huseyin Arslan, Tampa, FL (US)

(73) Assignee: NTT DoCoMo, Inc., Tokyo (JP)

( * ) Notice: Subject to any disclaimer, the term of this patent is extended or adjusted under 35 U.S.C. 154(b) by 56 days.

(21) Appl. No.: 13/165,059

(22) Filed: Jun. 21, 2011

(65) Prior Publication Data

US 2011/0312317 A1  Dec. 22, 2011

Related U.S. Application Data

(60) Provisional application No. 61/356,950, filed on Jun. 21, 2010.

(51) Int. Cl.
*H04B 1/00* (2006.01)
(52) U.S. Cl.
USPC .... 455/63.2; 455/450; 455/114.2; 455/278.1; 455/296; 370/350; 370/329; 370/345; 375/346; 375/348
(58) Field of Classification Search .......... 455/450–454, 455/63.1, 114.2, 278.1, 296, 63.2; 370/350, 370/329–332, 345; 375/346, 348
See application file for complete search history.

(56) References Cited

U.S. PATENT DOCUMENTS

2011/0080896 A1 * 4/2011 Krishnamurthy et al. .... 370/336

OTHER PUBLICATIONS

Ismail Guvenc, Sibel Tombaz, Mustafa E. Sahin, Huseyin Arslan, and Hakan Ali Cirpan, "ICI-Minimizing Blind Uplink Time Synchronization for OFDMA-Based Cognitive Radio Systems", Dec. 4, 2009, DOCOMO Communications Laboratories USA.*
Chandrasekhar, V , et al., "Femtocell networks: a survey," *IEEE Commun. Mag.*, vol. 46, No. 9, pp. 59-67, Sep. 2008.
Yeh, S.P., et al., "WiMAX femtocells: a perspective on network architecture, capacity, and coverage," *IEEE Commun. Mag.*, vol. 46, No. 10, pp. 58-65, Oct. 2008.

(Continued)

*Primary Examiner* — Vladimir Magloire
(74) *Attorney, Agent, or Firm* — Haynes and Boone, LLP

(57) ABSTRACT

In one embodiment, a method of mitigating uplink inter-carrier interference (ICI) from macrocell mobile stations at a dedicated channel femtocell base station is provided that includes: determining a timing offset for a femtocell uplink symbol timing that reduces the ICI based upon an expected spatial distribution for the macrocell mobile stations with respect to the femtocell base station; communicating the timing offset to at least one femtocell mobile station; and at the femtocell base station, receiving an uplink symbol transmission from the at least one femtocell mobile station according to the timing offset.

15 Claims, 10 Drawing Sheets

OTHER PUBLICATIONS

Sahin, et al., "Opportunity detection for OFDMA-based cognitive radio systems with timing misalignment," *IEEE Trans, Wireless Commun.*, vol. 8, No. 10, pp. 5300-5313, Oct. 2009.

Batariere, M., et al., "Cyclic prefix length analysis for 4G OFDM systems," in *Proc, IEEE VTC-2004/Fall*, vol. 1, Sep. 2004, pp. 543-547.

Guvenc, I., "Statistics of macrocell-synchronous femtocell-asynchronous users-delays for improved femtocell uplink receiver design," *IEEE Commun. Lett.*, vol. 13, No. 4, pp. 239-241, Apr. 2009.

Simonsson, A., et al., "Uplink Power Control in LTE—Overview and Performance," in *Proc. IEEE VTC-2004/Fall*, Sep. 21-24, 2008, pp. 1-5.

*TS 36.213 LTE; Evolved Universal Terrestrial Radio Access (E-UTRA); Physical layer procedures*, 3GPP Std., Rev. V9.1.0, 2010.

Muhammad, B., et al., "Performance Evaluation of Uplink Closed Loop Power Control for LTE System," in *Proc. IEEE VTX-2009/Fall*, Sep. 20-23, 2009, pp. 1-5.

*Uplink Power Control for E-UTRA Range and Representation of P0*, Ericsson Std., Rev. R1-074850, Nov. 5-9, 2007.

Bala, E., et al., "On the uplink synchronization of OFDMA systems," in *Proc. Military Commun. Conf.*, (MILCOM), vol. 2, Oct. 17-20, 2005, pp. 1133-1139.

Sahin, et al., "Opportunity Detection for OFDMA Systems with Timing Misalignment," in *Proc. IEEE Global Telecommun. Conf.*, (GLOBECOM), Nov. 2008, pp. 1-6.

\* cited by examiner

INTER-CARRIER INTERFERENCE MANAGEMENT IN DEDICATED CHANNEL FEMTOCELL NETWORKS

RELATED APPLICATION

This application claims the benefit of U.S. Provisional Application No. 61/356,950, filed Jun. 21, 2010.

TECHNICAL FIELD

The present invention relates to wireless communications technology. More specifically, the present invention relates to the management of inter-carrier-interference observed at a femtocell network that uses multi-carrier signaling.

BACKGROUND

To enable the high data rates required for next generation wireless systems, orthogonal frequency division multiple access (OFDMA) technology has become popular. In an OFDMA network, each macrocell mobile station (mMS) is synchronized with a macrocell base station (mBS) such that the mobile stations stagger their transmission times so that all uplink symbols arrive at the macrocell base station simultaneously. To provide this synchronized transmission, the mobile stations time their transmissions according to their range from the base station. The mobile stations at the outer edge of the macrocell start their transmission first whereas mobile stations closer to the base station will transmit in a delayed fashion with regard to the outlying mobile stations. In this fashion, the transmissions from the variously-distributed mobile stations arrive simultaneously at the base station.

This staggered transmission by mobile stations in an OFDMA (or OFDM) network presents challenges to the incorporation of femtocell networks within the macrocellular network. In that regard, femtocell networks are one of the promising technologies for next generation wireless communication systems. They satisfy the demand for higher data rates, reduce the costs of service providers, enable better in-door coverage, and reduce the load on macrocellular networks. But the macrocell mobile stations do not synchronize their transmissions with regard to a femtocell base station (fBS) but instead to the macrocell base station as discussed above. Thus, whereas the macrocell mobile stations' uplink transmissions are received synchronously at the macrocell base station, these same transmissions will arrive asynchronously at the femtocell base station. The femtocell network may operate on a dedicated channel to avoid co-channel interference from the macrocell data traffic. But the difference between the arrival times of the uplink signals at the femtocell base station can introduce inter-carrier-interference (ICI) with respect to OFDMA signaling parameters such as the cyclic prefix (CP) length. The sub-carriers carrying the macrocell traffic will thus interfere with the femtocell sub-carriers even though the femtocell network operates on a dedicated channel.

The statistics for this asynchronous reception at the femtocell base station depends on a location of the femtocell base station within the macrocell and the distribution of the macrocell mobile stations within the macrocell. FIG. 1 illustrates an example femtocell-containing macrocell scenario. A macrocell mobile station 120 is relatively close to a femtocell base station 150 whereas a macrocell mobile station 160 is relatively farther away from femtocell base station 150. Femtocell base station 150 may be assumed to be synchronized to the first arriving mobile station uplink signal, which in FIG. 1 would correspond to the uplink transmission from mobile station 120. If the remaining mobile stations are arrayed in the macrocell relatively close to mobile station 120, the arrival times for the uplink transmissions from these remaining mobile stations may be captured within the CP length of the femtocell signal, thereby limiting inter-carrier interference (ICI) at the femtocell base station. However, if the femtocell base station is deployed near the macrocell edge, variance of the macrocell mobile station uplink signal arrival times at the femtocell base station will be larger depending on the location of the macrocell mobile stations within the macrocell. For example, the range between macrocell mobile station 160 and the femtocell base station may be such that the uplink signals from station 160 arrive at the femtocell base station with a delay that exceeds the CP length, which causes ICI at the femtocell base station.

Accordingly, there is a need in the art for ICI mitigation techniques for dedicated channel femtocell networks.

SUMMARY

In a typical macrocell network, all macrocell mobile stations are synchronized to their macrocell base station during the uplink. The mobile stations that are closer to the base station transmit their signals delayed with respect to mobile stations farther away so that all the uplink signals arrive at the base station at the same time. However, uplink transmissions from the macrocell mobile stations are received by the femtocell base station with different delays, which may cause inter-carrier interference at the femtocell base station. Inter-carrier interference (ICI) and also inter-symbol interference occurs in orthogonal frequency division multiple access (OFDMA) based networks from delays larger than the cyclic prefix of the desired signal. As disclosed further herein, the concept of a zero-ICI region is introduced.

In accordance with a first embodiment, a method of mitigating uplink inter-carrier interference (ICI) from macrocell mobile stations at a dedicated channel femtocell base station is provided that includes: determining a timing offset for a femtocell uplink symbol timing that reduces the ICI based upon an expected spatial distribution for the macrocell mobile stations with respect to the femtocell base station; communicating the timing offset to at least one femtocell mobile station; and at the femtocell base station, receiving an uplink symbol transmission from the at least one femtocell mobile station according to the timing offset.

In accordance with a second embodiment, a dedicated channel femtocell base station is provided that includes: a processor configured to determine a timing offset with respect to macrocell mobile stations' uplink transmissions that reduces a resulting inter-carrier interference in the dedicated channel, wherein the processor is further configured to determine the timing offset with regard to an expected distribution of the macrocell mobile stations, and a memory for storing the timing offset.

In accordance with a third embodiment, a method of reducing inter-carrier interference (ICI) for a dedicated channel femtocell base station is provided that includes: at the femtocell base station, receiving uplink transmissions from a plurality of macrocell mobile stations; determining a first received one of the uplink transmissions; and determining a timing offset with respect to a symbol frame timing for the first received one of the uplink transmissions that minimizes the dedicated channel ICI at the femtocell base station based upon an expected distribution of the macrocell mobile stations and a cyclic prefix (CP) length for femtocell uplink transmissions.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

DESCRIPTION OF FIGURES

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
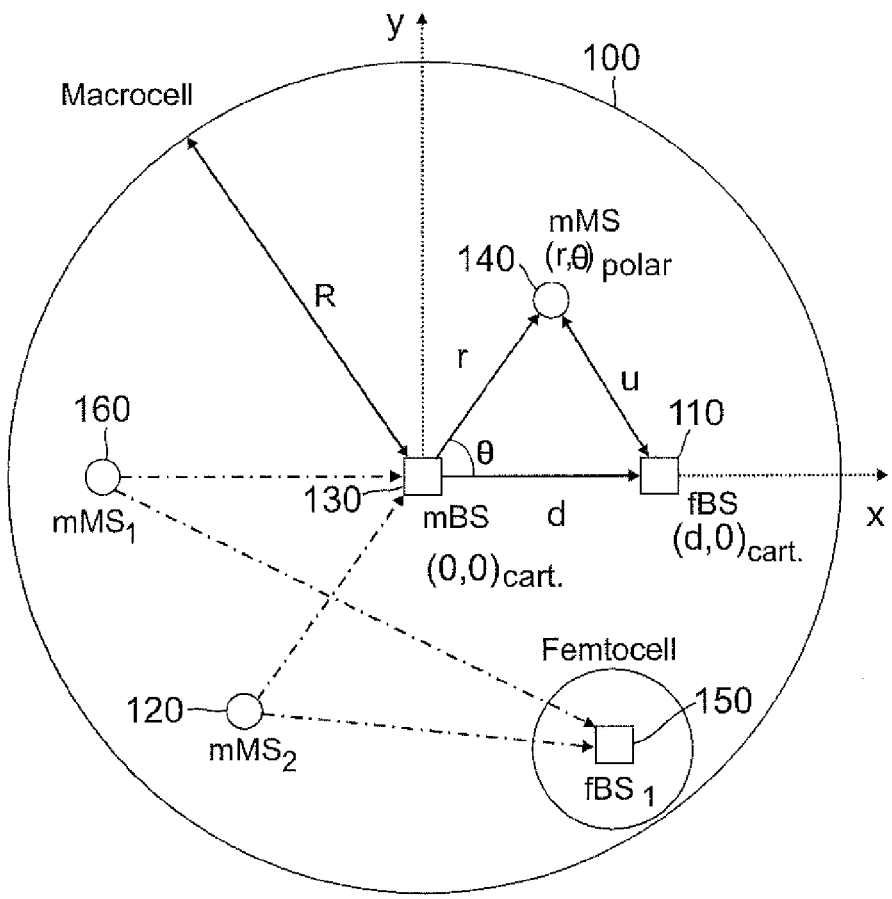
FIG. 1 is an illustration of an example femtocell network within a macrocell network.

To better illustrate the advantageous inter-carrier interference (ICI) mitigation techniques disclosed herein, the statistical properties of ICI at the femtocell base station in a multi-carrier macrocell network will first be discussed. Referring again to FIG. 1, macrocell 100 is assumed without loss of generality to be circular rather than hexagonal to simplify the analysis. Given this circular geometry for macrocell 100, it is convenient to use polar coordinates to define the locations of the various mobile stations. A macrocell base station 130 is located at the polar coordinate pole. The locations for macrocell mobile stations 120, 160, and 140 are given in the form of $(r,\theta)$, where $\theta$ is the angle and r represents the radial distance between the mobile station and the macrocell base station. A femtocell base station (fBS) 110 is located at $(d,0)$, where d is the radial distance and $\theta=0$ the angle between the macrocell base station and femtocell base station 110. Thus, the distance between any macrocell mobile station and base station 110 is given by $$u(r,\theta) = \sqrt{r^2 + d^2 - 2dr\cos(\theta)}. \quad (1)$$

Since each of the macro mobile stations is fully synchronized to the macrocell base station, a first transmission will start from those mobile stations located farthest from the base station. This first transmission may be assumed to begin at $t=0$ seconds without loss of generality. Given this synchronization between the macrocell mobile stations and the base station, the arrival time of the mobile stations signals at femtocell base station 110 is given as $$t_{rx}(r,\theta) = \frac{R - r + \sqrt{r^2 + d^2 - 2dr\cos(\theta)}}{c} = \frac{z(r,\theta)}{c}, \quad (2)$$

where c is the speed of light. Also, in case of uniform distribution of the mobile stations, a cumulative distribution function of $z(r,\theta) = ct_{rx}(r,\theta)$ may be derived as $F_z(r,\theta)(z)$ as known in the art. In addition, power control is a factor for the interference at the femtocell base station.

Power control is used for setting the transmission power of the macrocell mobile stations to proper levels. Power control not only provides improvement of the system capacity, but it also reduces the power consumption by the mobile stations. In the uplink (from the mobile stations to the base station), there will ideally be no uplink interference between different mobile stations due to the orthogonality of the transmissions. However, in the Long Term Evaluation (LTE) wireless protocol, there will be interference between neighboring cells due to a frequency reuse factor, degrading the system capacity. In order to minimize interference, power control is thus required in OFDM-based systems. According to the 3GPP LTE specifications, a power control formula is defined as $$P_{tx} = \min[P_{max}, \alpha \cdot PL_{mBS} + P_0 + 10\log_{10}M + \delta_{MCS} + f(\Delta_i)], \quad (3)$$

where $P_{tx}$ is the output power of a macrocell mobile station, $P_{max}$ is the maximum allowed power for the mobile station, $PL_{mBS}$ is path loss between the mobile station and the macrocell base station, M is the number of allocated physical resource blocks (PRB), and $P_0$ is the total targeted power in dBm per PRB at the receiver. The parameter $\alpha$ is a path loss compensation parameter. It varies between 0 and 1.0 in 3GGP LTE. When it is 1, it means full path loss compensation is applied. Conversely if the path loss compensation parameter is 0, there is no compensation for path loss. $\delta_{MCS}$ is the cell specific parameter which depends on the modulation and coding scheme, and $f(\Delta_i)$ is a function which allows to use for corrections. These parameters provide feedback for closed loop power control of the mobile stations. In one embodiment, it is assumed that each macrocell mobile station can transmit its signals with the compensated power level using one PRB (i.e., $10\log_{10}M=0$). Since the focus is on analyzing the effect of a macrocell mobile station (mMS) on the femtocell base station (fBSs) in terms of distance, the feedback terms can be ignored and open loop power control can be used. As known in the arts, open loop transmission power for a macrocell mobile station is given as $$P_{tx} = P_0 + \alpha \cdot PL_{mBS}, \qquad (4)$$

$$P_0 = SNR_t + P_{noise}, \qquad (5)$$

$$PL_{mBS} = 10\eta \log_{10} \frac{4\pi r}{\lambda}, \qquad (6)$$

where $SNR_t$ is a target received power over the noise floor at the macrocell base station (mBS), $P_{noise}$ is the noise power level at the mBS, $\eta$ is a path loss exponent, and $\lambda$ is the wavelength of the transmitted signal. On the other hand, the OFDM signal transmitted by the ith macrocell mobile station can be written in sample time domain as $$x_{i,CP}^m(n) = \sqrt{P_{tx}} \sum_{k=0}^{N-1} S_i^m(k) e^{j2\pi \frac{k}{N}n}, \ N_{CP} \le n \le N-1 \qquad (7)$$

where N is number of available subcarriers, m is the OFDM symbol index, k is the subcarrier index, $N_{CP}$ is the length of the cyclic prefix, and $S_i^m(k)$ is the information symbol carried by the kth subcarrier and mth OFDM symbol for this ith macrocell mobile station.

Given that the transmission power of a macrocell mobile station is equal to $P_{tx}$, the expected total power of an OFDM symbol is thus equal to $P_{tx}$. Then, the expected total received power at a femtocell base station (in Watts) is given in by $$P_{rx} = 10 \frac{P_0 + \alpha \cdot PL_{mBS} - PL_{fBS}}{10} \qquad (8)$$

where $$PL_{fBS} = 10\eta \log_{10} \frac{4\pi u(r, \theta)}{\lambda}. \qquad (9)$$

A flat fading channel model is used for simplification of derivations in the rest of the disclosure without loss of generality. The expected inter-carrier interference (ICI) and inter-symbol interference (ISI) can now be derived with regard to reception of uplink signals at a femtocell base station 150.

Figure 2:
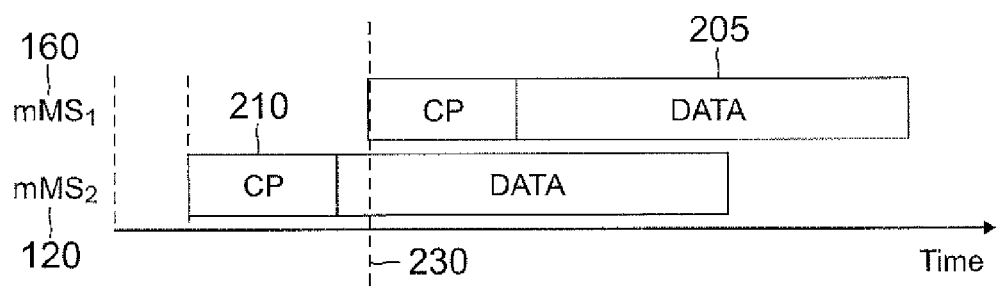
FIG. 2 illustrates a timing relationship between received uplink symbols from macrocell mobile stations at a femtocell base station.
Figure 3A:
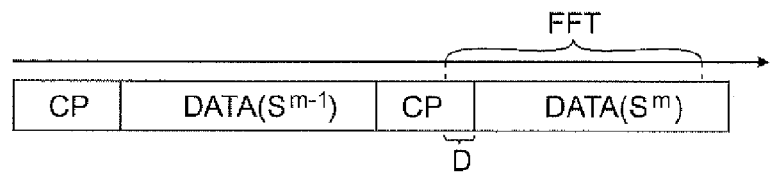
FIG. 3a shows an FFT sampling window on a received uplink signal for a delay less than the CP length.

An example of the timing misalignment between macrocell uplink signals from mobile stations 160 and 120 being received at femtocell base station 150 is shown in FIG. 2. Since station 120 is closer to base station 150 but synchronized with station 160 in that both have the same range separation from mBS 130, an uplink symbol 210 is received first from station 120 followed by reception of an uplink symbol 205 from station 160. Symbol 205 is delayed by a delay 230 that exceeds the cyclic prefix length CP, which may cause ICI. Therefore, firstly, we analyze the power of ICI, inter-symbol-interference (ISI), and desired (DES) terms for a given timing offset in an uplink OFDM system. Timing offset may lead to orthogonality loss between subcarriers, which causes interaction between subcarriers referred to as inter-carrier interference (ICI). If there is a conflict between the same subcarriers of consecutive OFDM symbols, then inter-symbol interference (ISI) occurs. The desired term is the remaining signal component apart from the ISI and the ICI terms. Should the delay D for a received symbol be smaller than the CP length ($N_{CP}$>D) as shown in FIG. 3(a), the received sample domain signal from the ith user is given by $$y_{i,}^m(n) = \sqrt{P_{rx}} \sum_{k=0}^{N-1} S_i^m(k) e^{j2\pi \frac{k}{N}(n-D)}. \qquad (10)$$

Removing the CP part and applying an FFT operation to (10) gives $$Y_i^m(l) = \sqrt{P_{rx}} S_i^m(l) e^{-j2\pi \frac{l}{N}D}. \qquad (11)$$

Figure 3B:
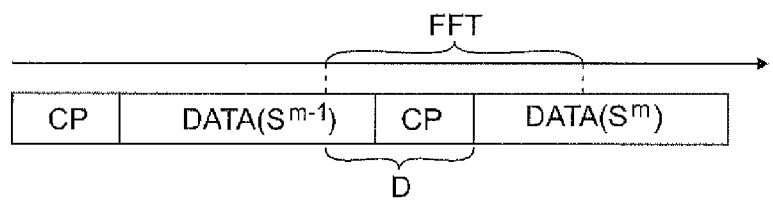
FIG. 3b shows an FFT sampling window on a received uplink signal for a delay greater than the CP length.

Equation (11) represents the desired term which is rotated. In that case, there are no ICI and ISI terms. Expected power of the whole signal is given as $E[P_{ALL}]=P_{rx}$, and ISI and ICI terms are equal to zero. However, if the delay is greater than the CP length ($N_{CP}$<D) as in FIG. 3b, the FFT becomes $$Y_i^m(l) = \sqrt{P_{rx}} S^m(l) \frac{N-D+N_{CP}}{N} e^{-j2\pi \frac{l}{N}D} + \qquad (12)$$

$$\sqrt{P_{rx}} S^{m-1}(l) \frac{D-N_{CP}}{N} e^{-j2\pi \frac{l}{N}(D-N_{CP})} +$$

$$\frac{\sqrt{P_{rx}}}{N} \sum_{k=0, k \ne l}^{N-1} S^{m-1}(k) e^{j2\pi \frac{k}{N}(N_{CP}-D)} \frac{1 - e^{j2\pi \frac{(k-l)(D-N_{CP})}{N}}}{1 - e^{j2\pi \frac{(k-l)}{N}}} -$$

$$\frac{\sqrt{P_{rx}}}{N} \sum_{k=0, k \ne l}^{N-1} S^m(k) e^{-j2\pi \frac{k}{N}D} \frac{1 - e^{j2\pi \frac{(k-l)(D-N_{CP})}{N}}}{1 - e^{j2\pi \frac{(k-l)}{N}}},$$

where the first term is the desired term, the second term is the ISI term, third term and the fourth terms show the ICI contributions caused by the previous OFDM symbol and the present OFDM symbol, respectively. From (12), the expected power of desired, ISI, and ICI terms are $$E[P_{DES}] = P_{rx} \left( \frac{N - D + N_{CP}}{N} \right)^2, \qquad (13)$$

$$E[P_{ISI}] = P_{rx} \left( \frac{D - N_{CP}}{N} \right)^2, \qquad (14)$$

$$E[P_{ICI}] = 2P_{rx} \left[ \left( \frac{D - N_{CP}}{N} \right) - \left( \frac{D - N_{CP}}{N} \right)^2 \right]. \qquad (15)$$

Figure 4:
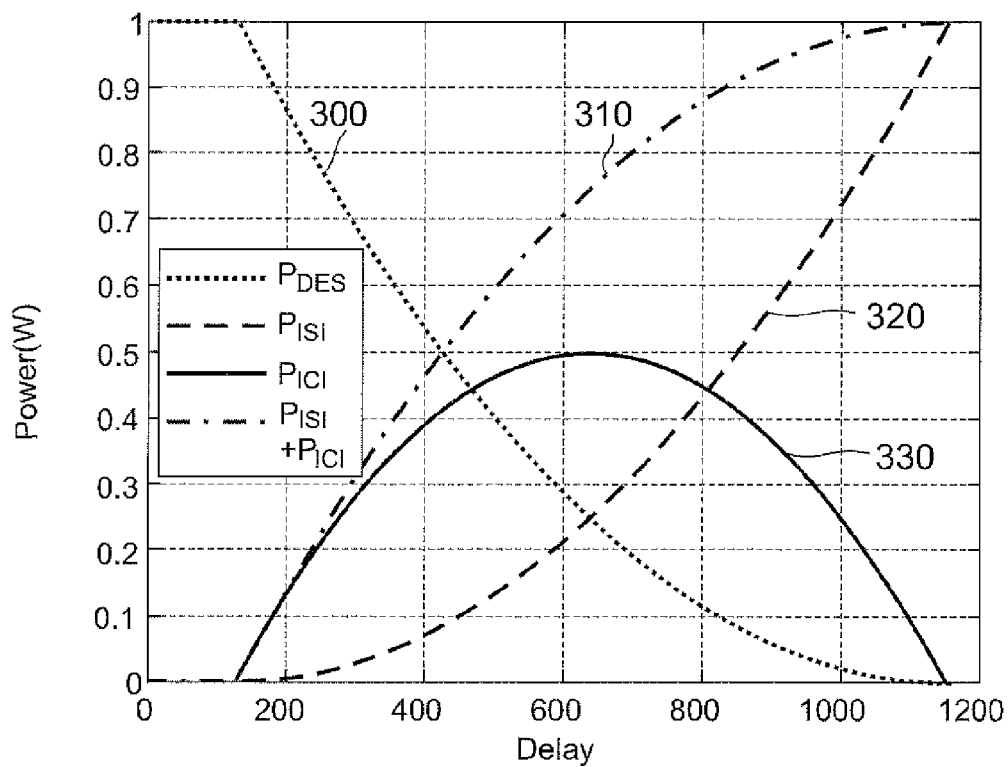
FIG. 4 is a graph of the desired signal power, the ICI power, and the ISI power as as function of delay (in samples), wherein the cylic prefix size is 128 samples and the symbol duration is 1024 samples.

In FIG. 4, these terms are plotted when 1024 subcarriers are used and a CP length is ⅛ the number of subcarriers. The delay is illustrated as a function of the sampling index. In this case, the cyclic prefix receives 128 samples and the uplink symbol receives 1024 samples. An ICI power 330 is maximized at D=1024/2+128=640 due to the maximum orthogonality loss. After that point, ICI power decreases since the orthogonality between the subcarriers increases. An ISI power 320 is always an increasing function of the delay, since more samples are received from the previous OFDM symbol for larger delay values. While ISI 320 and a desired term 300 show the signal power on already occupied subcarriers, ICI term 330 shows the effect of certain subcarriers on the other carriers. Combined interference power 310 is the sum of ICI 330 and ISI 320 powers. In a dedicated channel femtocell, the ISI from a macrocell uplink symbol is relatively harmless in that it is constrained to the macrocell subcarriers—the femtocell has its own dedicated subcarriers that are not affected by the macrocell ISI. Therefore, the main concern for a dedicated channel femtocell network is the power of the ICI components. In a dedicated access or opportunistic channel access in a femtocell network, the ICI leakage from the macrocell uplink transmissions may degrade the capacity of femtocell network. As the number of simultaneously transmitting interfering macrocell users increases, the uplink ICI at the femtocell base station increases due to the accumulation of total ICI power.

To minimize the ICI power, a femtocell base station adjusts the uplink timing for the femtocell such that the uplink transmissions from a dominant macrocell mobile station (or mobile stations) are received in a zero-ICI delay timing relationship. For example, as seen in FIG. 4, should an uplink macrocell symbol be received with a delay of approximately less than 300 samples or greater than 1150 samples, there is no ICI.

If the macrocell mobile stations are considered to be randomly distributed across the macrocell, the relative delays of the resulting uplink transmissions at the femtocell base station will also be randomly distributed. For example, consider femtocell base station 110 of FIG. 1, which is at a distance of d away from macrocell base station 130. Considering that the macrocell mobile stations are uniformly distributed within the macrocell, and assuming a relatively large number of such users (or, equivalently, assuming that there are mobile stations at the edge of the macrocell, as well as in the vicinity of the femtocell), an arrival time of the first macrocell mobile signal at the base station 110 can be written as $$\tau = \frac{R-d}{c}. \tag{16}$$

Then, given (2), a relative delay of an macrocell mobile station signal arriving at a femtocell base station with respect to the first arrived signal can be written as $$t_D(r, \theta) = t_{rx}(r, \theta) - \tau = \frac{d - r + \sqrt{r^2 + d^2 - 2dr\cos(\theta)}}{c}. \tag{17}$$

Using (17), delays can be calculated in sample time domain as $$D(r, \theta) = \frac{d - r + \sqrt{r^2 + d^2 - 2dr\cos(\theta)}}{c} \frac{N}{T_s}, \tag{18}$$

which can also be written in terms of $z(r, \theta)$ as $$D(r, \theta) = \frac{z(r, \theta)}{c} \frac{N}{T_s} - \frac{R - d}{c} \frac{N}{T_s}. \tag{19}$$

Using the CDF of $z(r,\theta)$ as discussed previously, the CDF of $D(r,\theta)$ is derived performing a distribution analysis of functions with one random variable $$F_{D(r,\theta)}(D) = Prob\left\{z(r, \theta) < c\frac{T_s}{N}D + R - d\right\} \tag{20}$$

$$= F_{z(r,\theta)}\left(c\frac{T_s}{N}D + R - d\right).$$

Figure 5:
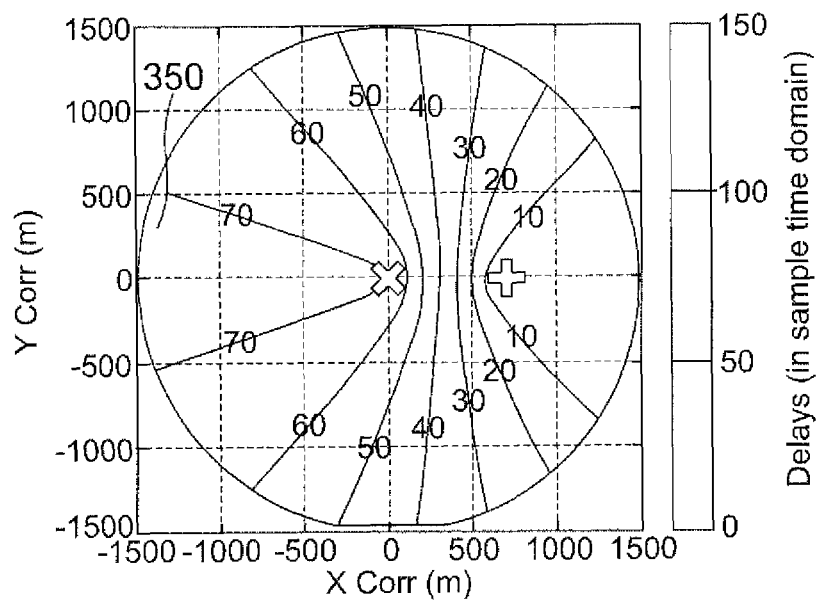
FIG. 5 shows a delay distribution for different fBS locations in a macrocell (cell radius R=1500 m and separation d=700 m).
Figure 6:
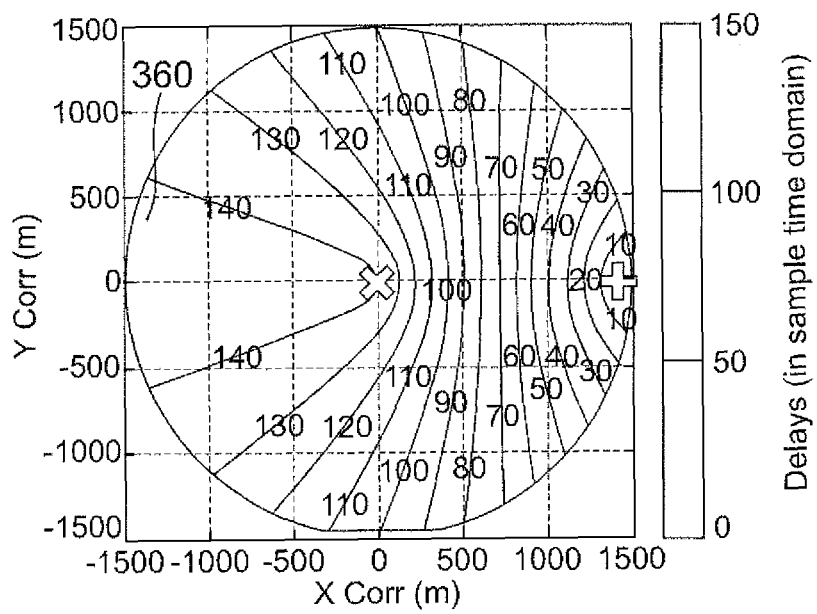
FIG. 6 shows a delay distribution for different fBS locations in a macrocell (cell radius R=1500 m and separation d=1400 m).

To better illustrate these properties, a distribution of sample-time domain delay is plotted using equation (18) with respect to different femtocell base station locations in FIGS. 5 and 6. These figures correspond to a macrocell radius R=1500 m, N=1024 and Ts=66.7 μs so as to match typical 3GPP LTE parameters. In FIG. 5 and FIG. 6, a cross hatch mark at the macrocell center shows the location of the mBS whereas a plus sign shows the location of the femtocell base station. A region 350 in FIG. 5 and a region 360 in FIG. 6 represents the regions of greatest delay. It can be seen that the signals with greatest delays are always coming from the negative x-axis with respect to the macrocell base station. The reasons of this behavior are: 1) the separation between the mMS and the fBS is larger in that region and 2) the uplink synchronization constraints of mMSs. In FIG. 5, the fBS is deployed at d=700 m and delays are varying around between 0 and 70 in terms of time samples. If the CP is selected as 128 in the network, the fBS of FIG. 5 will have no ICI. However, In FIG. 6, the fBS is deployed at d=1400 m and delays are varying around between 0 and 145 in terms of time samples. The fBS in FIG. 6 can thus be subjected to ICI since delays can be greater than the CP size. If there are mMSs located in region 360 in FIG. 6, these mMSs will contribute ICI to this fBS. Also, mMSs whose delays are smaller than the CP will not generate ICI in FIG. 6. As used herein, such regions are denoted as zero ICI (Z-ICI) regions.

Figure 7:
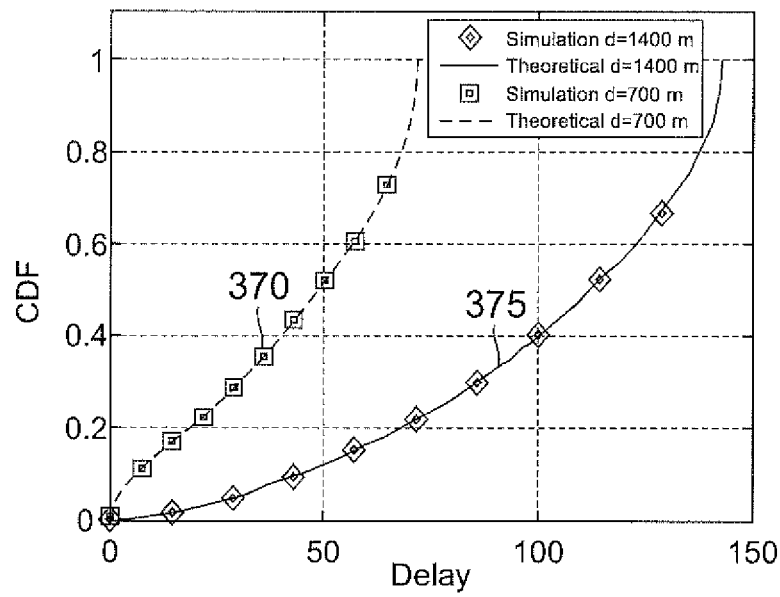
FIG. 7 shows the CDF of relative delays resulting from the distributions of FIGS. 5 and 6.

FIG. 7 shows CDF curves 370 and 375 corresponding to the distributions of FIG. 5 and FIG. 6, respectively. The CDF curves using the theoretical expression given in (20) match well with simulations results. The relative delays for small femtocell-to-macrocell separations such as 700 m are always within the cyclic prefix whereas for larger femtocell-to-macrocell separations the relative delays may exceed the cyclic prefix duration (such greater than 128 samples).

the Received OFDM symbole power of an mMS at the fBS can be expressed as in (8). Combination equations (6), (8), and (9), the received power can be written as $$P_{rx} = P_{0,W}\left(\frac{4\pi r}{\lambda}\right)^{\alpha\cdot\eta}\left(\frac{\lambda}{4\pi u(r, \theta)}\right)^{\eta} = P_{0,W}\frac{r^{\alpha\cdot\eta}}{u(r, \theta)^{\eta}}, \tag{21}$$

where $$P_{0,W} = 10^{\frac{P_0}{10}} = 10^{\frac{SNR_t + P_{noise}}{10}}.$$

The combination of equations (15) and (18) with (21) shows that the expected ICI power contribution of an mMS to an fBS in the macrocell is;

$$E[P_{ICI}] = \begin{cases} 2P_{0,W}\frac{r^{\alpha\cdot\eta}}{u(r, \theta)^{\eta}} \times \\ \left[\left(\frac{D(r, \theta) - N_{CP}}{N}\right) - \left(\frac{D(r, \theta) - N_{CP}}{N}\right)^2\right] & D(r, \theta) > N_{CP} \\ 0 & D(r, \theta) \leq N_{CP} \end{cases} \tag{22}$$

Figure 8:
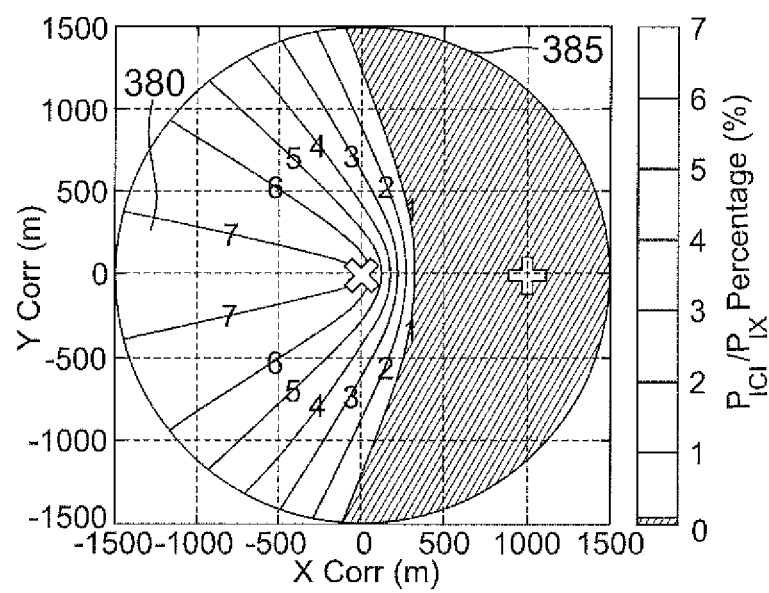
FIG. 8 shows a ratio of expected ICI power and received signal power (R=1500 m and d=1000 m).
Figure 9:
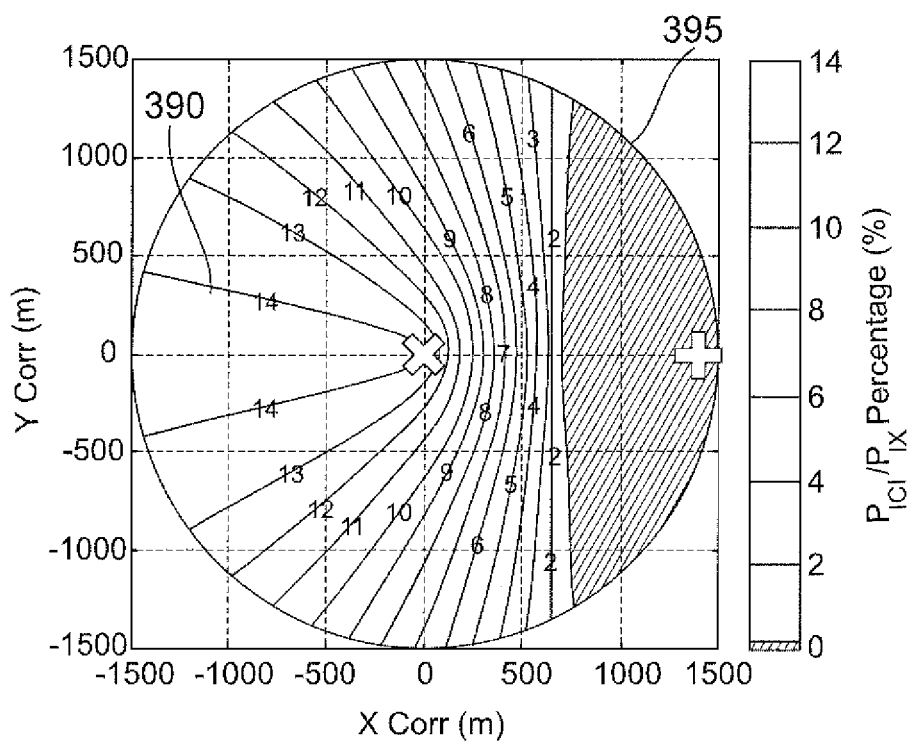
FIG. 9 shows a ratio of expected ICI power and received signal power (R=1500 m and d=1400 m).

While the first term in (22) represents the area where ICI occurs, the second term represents the zero ICI region in case of synchronization to the first arrived mMS signal at the fBS. In one embodiment, $N=1024$, $N_{CP}=1024/16=64$, $\alpha=0.8$, $P_0=-95$ dBm/PRB, $\eta=3$, operating frequency as 2.4 GHz, $R=1500$ m, and $T_s=66.7$ µs. Simulation results for such parameters are shown in FIGS. 8 and 9. In these figures, the mBS is located at the macrocell center as indicated by the cross-hatch whereas a plus sign shows the location of a femtocell base station (fBs). The distance between the fBS and mBS is 1000 m in FIGS. 8 and 1400 m in FIG. 9. The mMS locations are varied randomly in the cell and its ICI contributions are analyzed using both simulation results and the theoretical equations given in (22). FIG. 8 includes a Z-ICI region 385 whereas FIG. 9 includes a Z-ICI region 395.

In FIGS. 8 and 9, a ratio between the ICI power and the received power of mMSs (in terms of percentage) is indicated. In FIG. 8, the distance between the mBS and the fBS is relatively small in comparison with FIG. 9. Therefore, while at most 7 percent of the power received from the mMS signals appear as ICI to the IBS in FIG. 8 as represented by region 380, at most 14 percent $P_{rx}$ of the power received from the mMSs appear as ICI to the fBS in FIG. 9 as represented by region 390.

Figure 10:
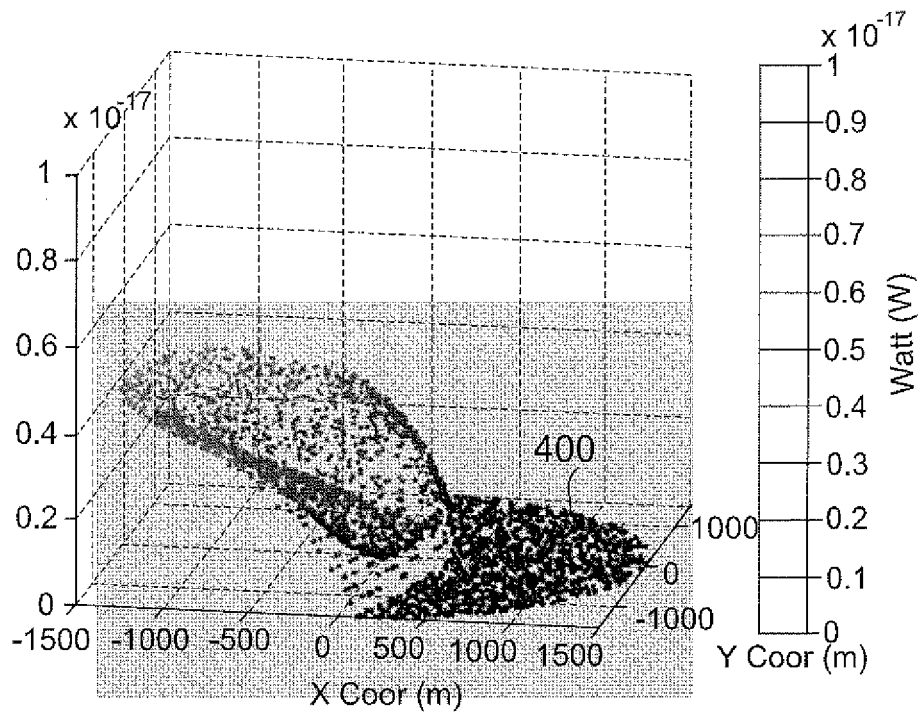
FIG. 10 shows the expected ICI powers for the macrocell distribution of FIG. 8.
Figure 11:
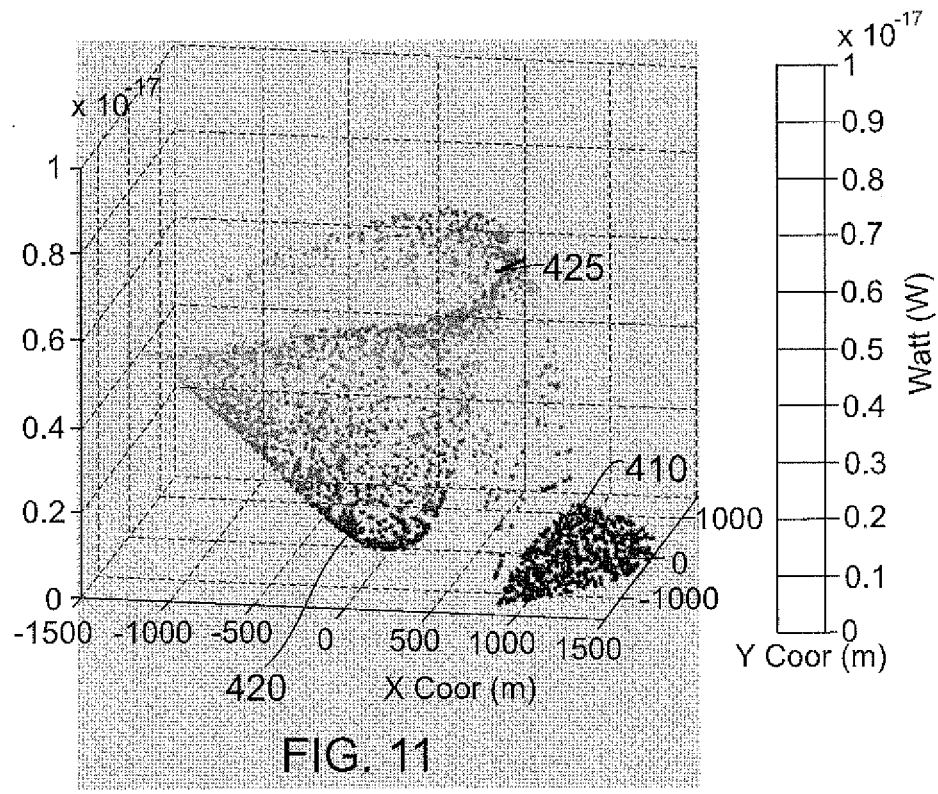
FIG. 11 shows the expected ICI powers for the macrocell distribution of FIG. 9.

FIGS. 10 and 11 show the ICI power for various mMSs locations corresponding to the scenarios of FIGS. 8 and 9, respectively. Since the fBS is relatively close to the mBS in FIG. 10, in other words close to the synchronization point, length of delays in the sample time domain can be more closer to the CP size for that fBS. Therefore, a Z-ICI region 400 covers more area in FIG. 10 as compared to a Z-ICI region 410 of FIG. 11. Since the fBS is closer to the cell edge in FIG. 11, the Z-ICI region becomes smaller as compared to FIG. 10. In addition, the ICI contribution of mMSs around the mBS will be lower than the mMSs located at the edge of the cell because the power of the mMSs that are closer to the mBS is lower than the other mMSs that are further away. Thus, an ICI dip 420 occurs around the mBS in the cell and ICI contribution can be very low. An ICI dip around the mBS is shown in FIG. 10 as well. For both plots, ICI contribution of the mMSs located at the cell edge are generally higher than the other areas within the cell. The reason for this high ICI contribution is the high transmit power of the mMSs at the cell edge due to the path loss compensation. If the distance between the fBS and the mBS decreases, effect of mMSs at the cell edge also decreases because of increasing orthogonality. An interesting situation occurs when the fBS is deployed at the cell edge as in FIG. 11. A maximum ICI contribution is coming from between the mBS and the fBS as shown by a region 425, and the shape of region 425 is like an arc. In this area, output powers of the mMSs are more effective on the ICI even when the timing offset is better than signals arriving from the mMSs at the cell edge.

Figure 12:
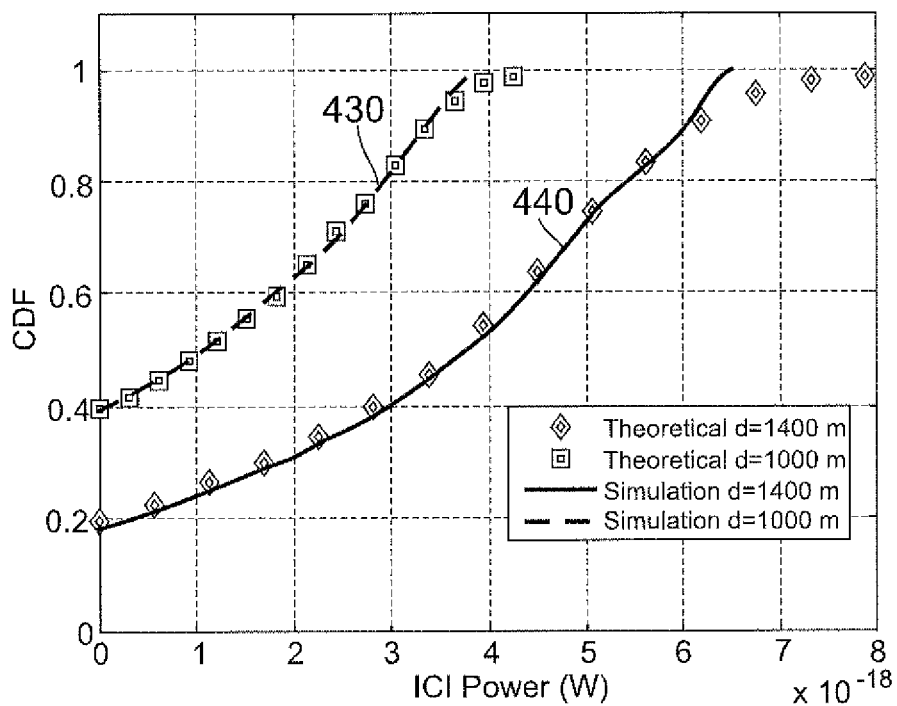
FIG. 12 shows the CDF ICI curves for the macrocell distributions of FIGS. 10 and 11.

FIG. 12 shows CDF curves 430 and 440 for the ICI power corresponding to FIGS. 10 and FIG. 11, respectively, where mMSs are uniformly distributed in the cell. The intercept point of the CDF curves at the Y axis gives the ratio between the Z-ICI region and the total macrocell area. According to curve 430, when the femtocell separation from the macrocell base station is equal to 1000 m, the ratio between the Z-ICI region and the total area is equal to 0.4. Also, as expected, the CDF curve become wider if the fBS is deployed further away from the mBS as shown by curve 440. FIG. 12 shows that ICI power calculations from the simulations match with the expected ICI power from theoretical expressions in (22).

Figure 13:
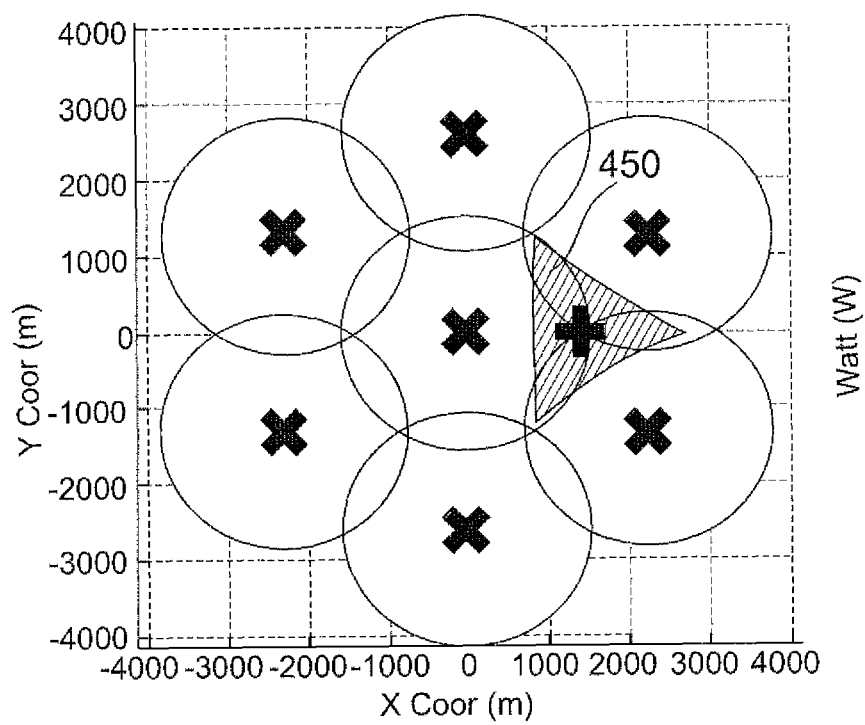
FIG. 13 shows the expected ICI powers for a multiple macrocell scenario (R=1500 m and d=1400 m).
Figure 14:
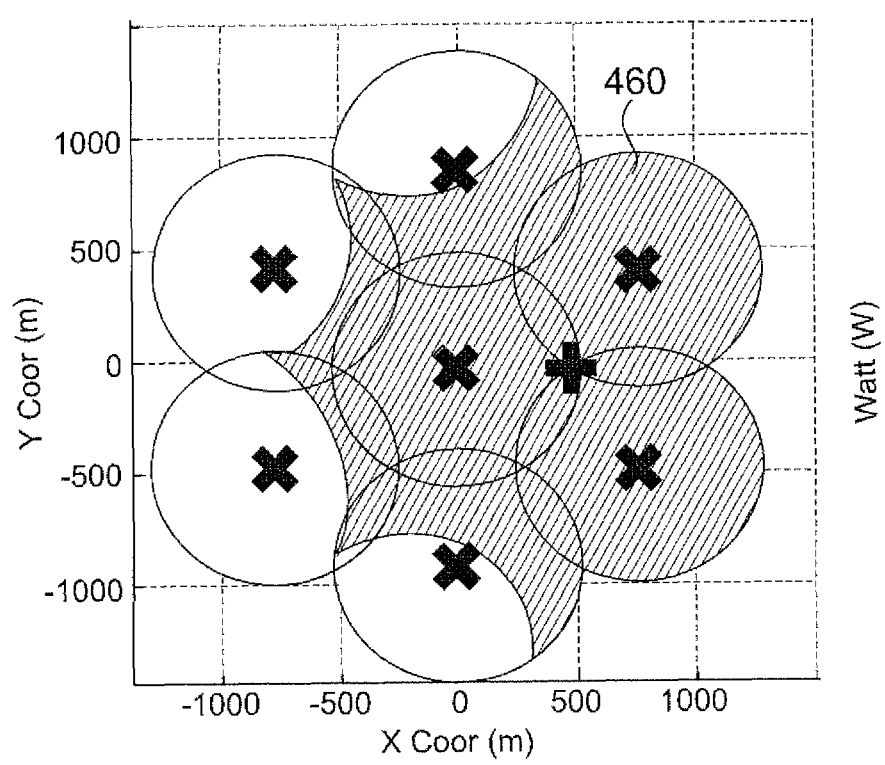
FIG. 14 shows the expected ICI powers for a multiple macrocell scenario (R=500 m and d=500 m).

The analysis may be extended to multiple cell scenarios in order to observe the effect of the neighbor cells and the macrocell coverage size on the fBS using the expected ICI power expression (22). In FIG. 13, a radius of each cell is 1500 m and the cells are overlapping within 375 m in order to avoid dead zones. The fBS is located 1400 m away from the center cell's base station. Even though the delays of the mMS's signals are relatively smaller in the center macrocell, signals from the neighbor macrocells arrive with larger delays. Thus, signals from the neighbor cells can cause significant ICI at the fBS due to the orthogonality losses. Also, since signals lose their powers with distance, maximum ICI contributions are coming from the closer neighbor macrocells. A Z-ICI region 450 covers only parts of three macrocell in this case. Conversely, in FIG. 14, the radius of each cell is just 500 m. Cells are overlapped within 120 m in order to get rid of dead zones. The fBS is located at the cell edge which is 500 m far away from the center mBS. In that case, since the diameter of mBS coverage is relatively small, the delay of mMS users is reduced. Hence, a Z-ICI region 460 covers a relatively larger area in FIG. 14 compared to Z-ICI region 450 of FIG. 13. In addition, ICI dips occurs around each mBS due to the power compensation practiced within each macrocell.

Figure 15:
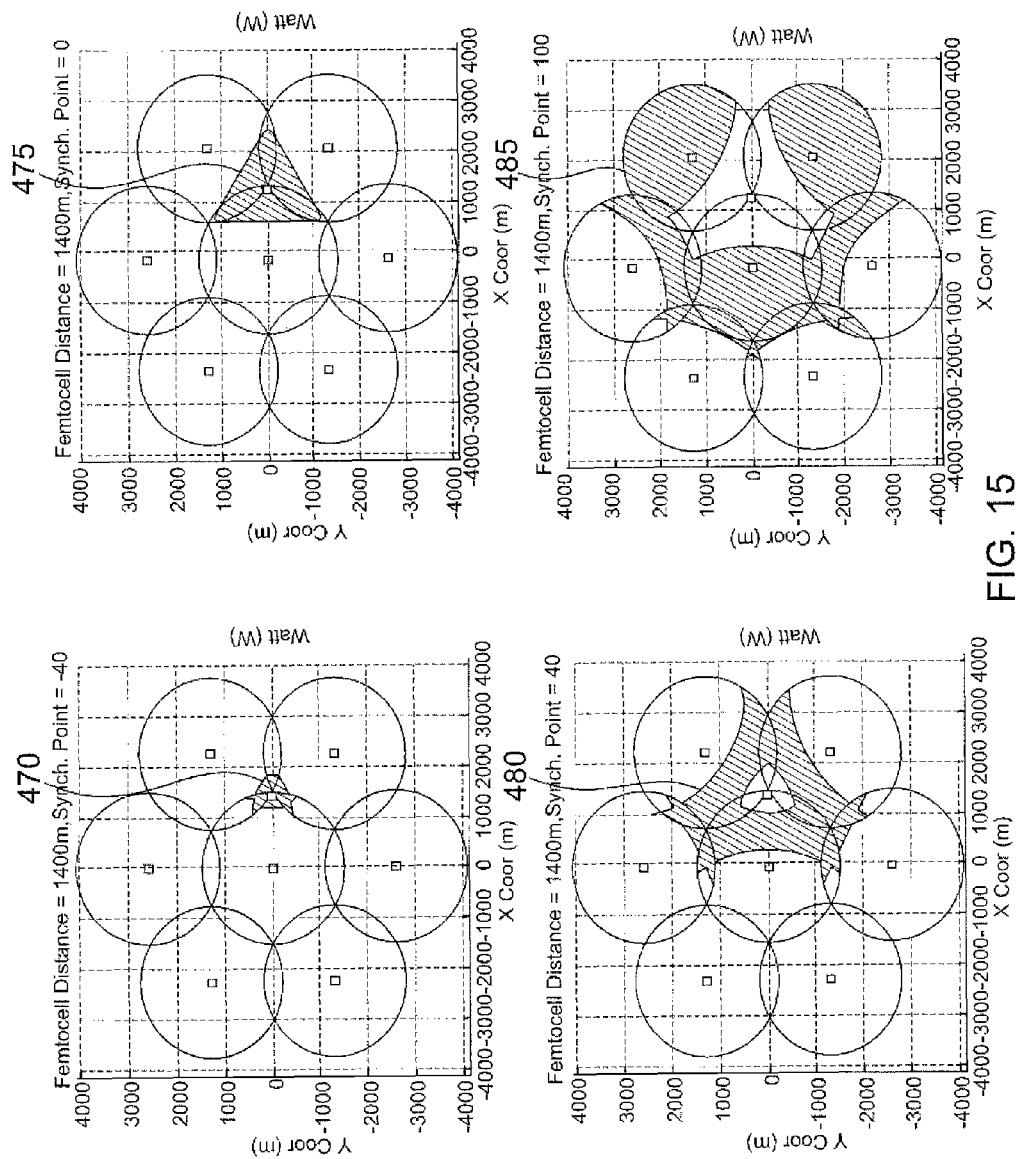
FIG. 15 shows the zero ICI regions for different synchronization points (−40, 0, 40, and 100 in time samples), for R=1500 m and d=1400 m in a multiple cell scenario.

FIG. 15 shows how the Z-ICI regions change with respect to the synchronization offset between the mMS and the fBS. The femtocell base station is located 1400 meters from the center macrocell base station and is thus at the cell edge. For a synchronization offset equal to −40 samples, a Z-ICI region 470 is minimal. As the synchronization offset becomes zero, an Z-ICI region 475 is increased. Similarly, for an increasing synchronization offset of 40, a zero ICI region 480 becomes larger. A zero ICI region 485 becomes larger still for a synchronization offset of 100 samples. Each zero-ICI region of FIG. 15 may be considered to represent a candidate zero-ICI region. The timing offset corresponding to each candidate zero-ICI region thus represents a candidate timing offset. The femtocell base station may thus compare the expected distribution for the macrocell mobile stations to the candidate zero-ICI regions to select the candidate zero-ICI region that maximizes the resulting reduction of ICI at the femtocell base station. The corresponding candidate timing offset would thus be selected as the optimal timing offset and communicated to the femtocell mobile stations so that they may synchronize their uplink transmissions accordingly. The comparison of the candidate zero-ICI regions to the expected distribution for the macrocell mobile stations may take into account not only how many mobile users are concentrated in the zero-ICI region but also the expected power for such users. In other words, even if there are fewer macrocell users located in zero-ICI region 475 as compared to region it may be better to select the synchronization point for region 475 in that those users are relatively close to the femtocell base station and will be received relatively strongly at the femtocell base station. On the other hand, region 485 is quite a bit larger than region 475 so that (assuming a uniform distribution) it will contain more macrocell users than region 485. It may thus be seen that selecting an optimal zero-ICI region is a balancing act of maximizing the number of macrocell users that may be included in the zero-ICI region as opposed to the ICI power contributed by those users outside of the zero-ICI region. Note that similar effects may also be observed by changing the CP size rather than the synchronization offset.

Figure 16:
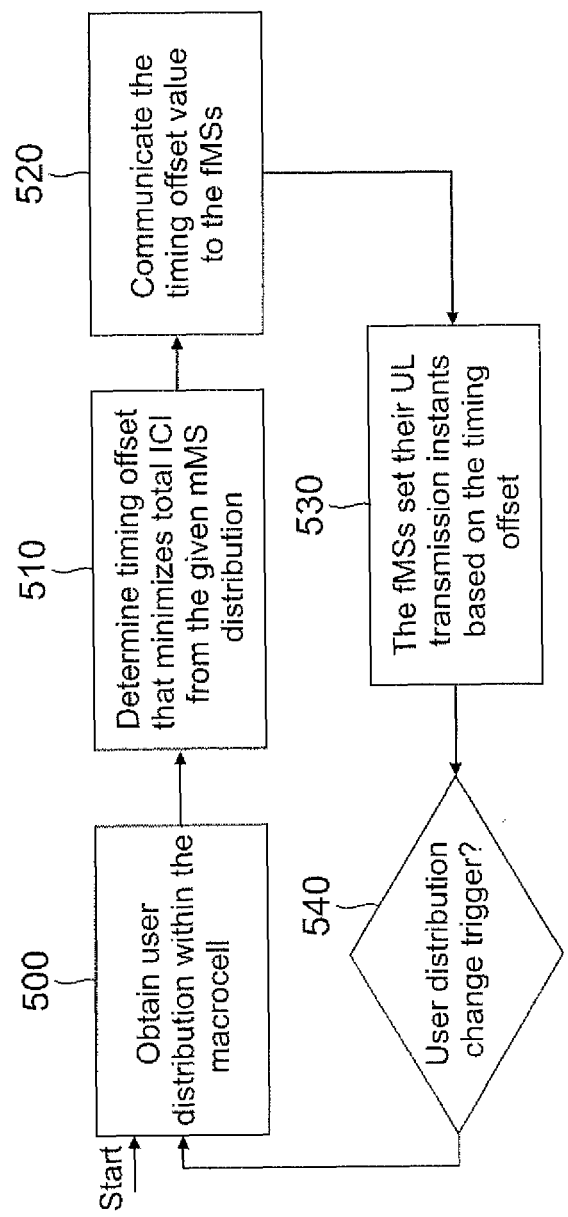
FIG. 16 is a flowchart for an ICI minimization UL synchronization method for a femtocell.

A flowchart for an ICI minimization uplink synchronization at the femtocell base station is provided in FIG. 16, where the femtocell adjusts its synchronization point based on the mMS user distribution within the macrocell. In an initial step 500, the femtocell obtains the information of the mMS user distribution within the macrocell. This information can be obtained periodically through the backhaul connection of the operator, using typical user population statistics conditioned on the time unit of an hour, day, week, month etc., or based on a special event information, e.g. a sports game or a concert where the users are concentrated within a certain geographic location for a limited period of time. Once the information about the user distribution within the macrocell is obtained, the timing offset that minimizes the total ICI contribution from the given user distribution is obtained in a step 510. Ideally, geographical areas with dense macrocell mobile station user population are included within the Z-ICI region as much as possible. Alternatively, the total ICI contribution from all the macrocell users are estimated for different synchronization instants, and the timing offset that minimizes the total ICI is selected as the synchronization instant between the macrocell and femtocell. Then, this synchronization point is communicated to all the femtocell mobile stations by the fBS in a step 520. In response, the femtocell mobile stations (fMSs) adjust their UL transmissions in a step 530 so that the UL signals arrive at the fBS at the synchronization instant determined by the MS. The fMSs use the same synchronization point as long as no trigger is received in a step 540 regarding a change in the user distribution. While the trigger may be an update from the operator network, a periodical trigger can also be used to pull new information regarding the most recent user distribution within the macrocell network.

Figure 17:
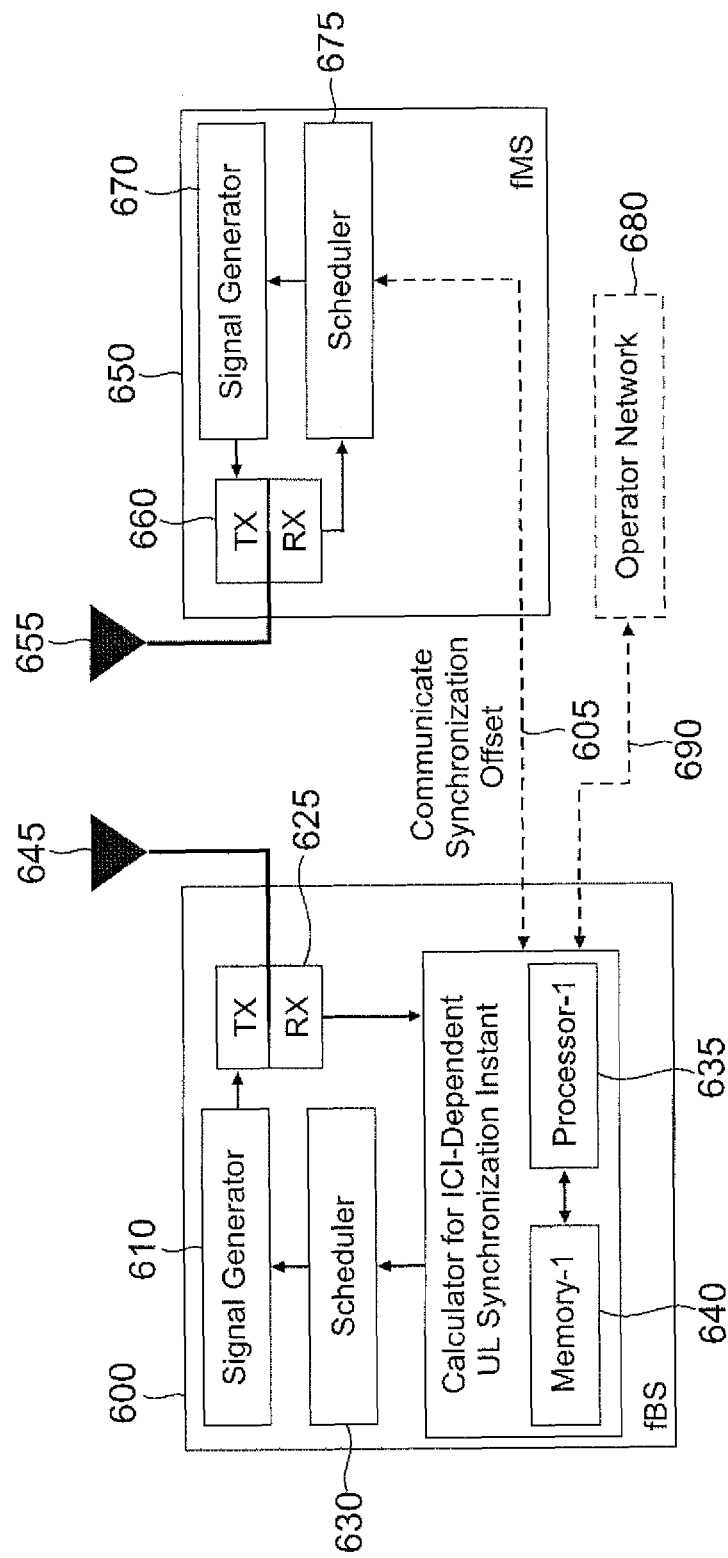
FIG. 17 is a block diagram of a femtocell base station and a corresponding femtocell mobile station configured to practice the ICI minimization techniques disclosed herein.

In FIG. 17, a femtocell base station 600 and femtocell mobile station 650 are illustrated that are configured to practice the ICI minimization method using UL synchronization as discussed, for example, with regard to FIG. 16. Femtocell base station 600 includes a memory 640 and a processor 635. Processor 635 is configured to calculate the synchronization point which minimizes the ICI from the current or estimated macrocell mobile station distribution. Memory 640 stores the resulting synchronization value. Processor 635 obtains the information about mMS distributions in, for example, a communication 690 from an operator network 680. Note that apart from the optimum synchronization point, optimum CP size can also be jointly determined. A scheduler 630 drives a signal generator 610 to generate a downlink transmission through transmit/receive module 625 as propagated from antenna 645. The resulting downlink transmission carries the synchronization point to fMS 650. Femtocell mobile station 650 includes a scheduler 675 that drives a signal generator 670 to generate uplink symbols according to the desired synchronization point. A transmit/receive module 660 then drives antenna 655 to produce the synchronized uplink transmission to fBS 600.

The above-described embodiments of the present invention are representative of many possible embodiments. It will thus be apparent to those skilled in the art that various changes and modifications may be made to what has been disclosed without departing from this invention. The appended claims encompass all such changes and modifications as falling within the true spirit and scope of this invention.

We claim:

1. A method of mitigating uplink inter-carrier interference (ICI) from macrocell mobile stations at a dedicated channel femtocell base station, comprising:
    determining a timing offset based upon an expected spatial distribution of the macrocell mobile stations and expected transmission powers for the macrocell mobile stations that balances maximizing a subset of the macrocell mobile stations included within a zero-ICI region with minimizing an ICI power received at the dedicated channel femtocell base station from a remaining portion of the macrocell mobile stations that are not within the zero-ICI region;
    communicating the timing offset to at least one femtocell mobile station; and
    at the dedicated channel femtocell base station, receiving an uplink symbol transmission from the at least one femtocell mobile station according to the timing offset.

2. The method of claim 1, wherein the expected spatial distribution is a spatial distribution for a single macrocell.

3. The method of claim 1, wherein the expected spatial distribution is a spatial distribution for a plurality of macrocells.

4. The method of claim 1, further comprising: estimating the expected spatial distribution based upon a historical distribution for the macrocell mobile stations.

5. The method of claim 1, further comprising:
    providing a plurality of candidate offsets; and
    for each candidate offset, determining a candidate zero-ICI region corresponding to the candidate offset and a cyclic prefix (CP) length for the femtocell uplink transmissions, wherein determining the timing offset includes comparing the spatial distribution for the macrocell mobile stations to the candidate zero-ICI regions to determine the candidate zero-ICI region that minimizes the ICI power at the dedicated channel femtocell base station.

6. The method of claim 1, further comprising:
    detecting a change in the expected spatial distribution; and
    determining a revised timing offset that reduces the ICI at the dedicated channel femtocell base station based upon the changed expected spatial distribution.

7. The method of claim 1, wherein the expected spatial distribution is a uniform random distribution of macrocell mobile stations.

8. The method of claim 1, wherein the dedicated channel for the dedicated channel femtocell base station comprises a dedicated plurality of OFDM sub-carriers that are not shared with the macrocell mobile stations.

9. A dedicated channel femtocell base station, comprising:
    a processor configured to determine a timing offset with respect to uplink transmissions from a plurality of macrocell mobile stations that maximizes a subset of plurality of the macrocell mobile stations within a zero intercarrier interference (ICI) region and minimizes an ICI power received at the dedicated channel femtocell base station from a remaining portion of the plurality of macrocell mobile stations, wherein the processor is further configured to determine the timing offset with regard to an expected distribution of the macrocell mobile stations and expected transmission powers from the macrocell mobile stations; and
    a memory for storing the timing offset.

10. The dedicated channel femtocell base station of claim 9, further comprising:
    a transmit/receive module configured to transmit the timing offset to at least one femtocell mobile station.

11. The dedicated channel femtocell base station of claim 10, wherein the transmit/receive module is further configured to receive the expected distribution from an operator network.

12. The dedicated channel femtocell base station of claim 9, wherein the expected spatial distribution is a spatial distribution for a single macrocell, the processor being further configured to determine the timing offset so as to minimize the ICI power from the remaining portion of the macrocell mobile stations in the single macrocell.

13. The dedicated channel femtocell base station of claim 9, wherein the expected spatial distribution is a spatial distribution for a plurality of macrocells, the processor being further configured to determine the timing offset so as to minimize the ICI power from the remaining portion of the macrocell mobile stations in the plurality of macrocells.

14. The dedicated channel femtocell base station of claim 9, wherein the processor is further configured to, with respect to a plurality of candidate offsets;
- for each candidate offset, determine a candidate zero-ICI region corresponding to the candidate offset and a cyclic prefix (CP) length for femtocell uplink transmissions, and
- compare the spatial distribution for the macrocell mobile stations to the candidate zero-ICI regions to determine the candidate zero-ICI region that minimizes the ICI power at the dedicated channel femtocell base station.

15. The dedicated channel femtocell base station of claim 9, wherein the processor is further configured to:
- detecting a change in the expected spatial distribution; and
- determine a revised timing offset that reduces the ICI power based upon the changed expected spatial distribution.

* * * * *